US009241102B2

(12) United States Patent
Bala et al.

(10) Patent No.: US 9,241,102 B2
(45) Date of Patent: Jan. 19, 2016

(54) VIDEO CAPTURE OF MULTI-FACETED DOCUMENTS

(71) Applicant: Xerox Corporation, Norwalk, CT (US)

(72) Inventors: Raja Bala, Pittsford, NY (US);
Hengzhou Ding, Webster, NY (US);
Jayant Kumar, Hyattsville, MD (US)

(73) Assignee: Xerox Corporation, Norwalk, CT (US)

( * ) Notice: Subject to any disclaimer, the term of this patent is extended or adjusted under 35 U.S.C. 154(b) by 262 days.

(21) Appl. No.: 13/705,771

(22) Filed: Dec. 5, 2012

(65) Prior Publication Data

US 2014/0152849 A1    Jun. 5, 2014

(51) Int. Cl.

| H04N 5/225 | (2006.01) |
|---|---|
| H04N 5/232 | (2006.01) |
| G06K 9/03 | (2006.01) |
| G06T 3/40 | (2006.01) |
| H04N 1/387 | (2006.01) |

(52) U.S. Cl.
CPC ............ *H04N 5/23229* (2013.01); *G06K 9/036* (2013.01); *G06T 3/4092* (2013.01); *H04N 1/3872* (2013.01); *H04N 5/23254* (2013.01); *H04N 5/23267* (2013.01); *G06K 2209/01* (2013.01)

(58) Field of Classification Search
USPC ................. 382/112, 140, 284; 358/3.24–3.27
See application file for complete search history.

(56) References Cited

U.S. PATENT DOCUMENTS

| 6,647,535 B1 | 11/2003 | Bozdagi et al. | |
| 2001/0045986 A1* | 11/2001 | Edwards | 348/239 |
| 2002/0186425 A1* | 12/2002 | Dufaux et al. | 358/497 |
| 2008/0079817 A1* | 4/2008 | Murata et al. | 348/222.1 |
| 2008/0111892 A1* | 5/2008 | Kwon | 348/220.1 |
| 2009/0189999 A1* | 7/2009 | Noh | 348/231.3 |
| 2009/0263028 A1* | 10/2009 | Kwon | 382/224 |
| 2010/0189356 A1* | 7/2010 | Sugita | 382/190 |
| 2010/0202026 A1* | 8/2010 | Chiu et al. | 358/488 |
| 2011/0109770 A1* | 5/2011 | Katoh | 348/231.99 |
| 2013/0155474 A1 | 6/2013 | Roach et al. | |
| 2014/0268247 A1 | 9/2014 | Sakaida et al. | |

OTHER PUBLICATIONS

Shafait et al., "Document Cleanup Using Page Frame Detection", International Journal on Document Analysis and Recognition, vol. 11, No. 2, 2008, pp. 81-96.
Ye et al., "Unsupervised Feature Learning Framework for No-reference Image Quality Assessment", IEEE International Conference on Computer Vision and Pattern Recognition (CVPR), Providence, RI, 2012.
Liu, et al., "Fast Directional Chamfer Matching", IEEE International Conference on Computer Vision and Pattern Recognition (CVPR), San Francisco, 2010.
Kumar et al., "Mobile Video Capture of Multi-page Documents", 6 pp.

* cited by examiner

*Primary Examiner* — Twyler Haskins
*Assistant Examiner* — Dwight C Tejano
(74) *Attorney, Agent, or Firm* — Fox Rothschild LLP (57) ABSTRACT

A system captures or otherwise receives a video and uses the video to create an electronic file corresponding to a multi-faceted printed artifact, such as a multi-page document. When the system receives the video, it selects a set of some or all of the video's image frames, determines a frame quality for each frame in the set, and identifies a subset of the frames such that the frame quality of each frame in the subset satisfies one or more image quality criteria. The subset will include at least one frame for each facet of the multi-faceted printed artifact, such as a page of the document. The processor then automatically combines the subset of frames into a single electronic file.

25 Claims, 6 Drawing Sheets

VIDEO CAPTURE OF MULTI-FACETED DOCUMENTS

BACKGROUND

Mobile electronic devices, such as smart phones, tablet computers, and other portable electronic computing devices, are increasingly being used for capturing and processing data. Typically, a mobile electronic device includes a high quality camera that includes both still photo and video image capture capabilities.

Mobile electronic device applications are available that capture images of printed artifacts, such as documents or other items that contain printed material on a substrate. However, such applications only permit the capture or one page of the document at a time. In addition, for printed artifacts that have a large physical size or a high image density, the camera may not be able to capture an image of the entire artifact with sufficient detail to enable capture of text or other fine details of the image.

This document describes methods and systems that are directed to solving at least some of the issues described above, and/or additional issues.

SUMMARY

A video capture system captures a video and uses the video to create an electronic file corresponding to a multi-faceted printed artifact, such as a multi-page document. The system may include a video capture module of an image capture device that captures the video while a user moves the artifact, the image capture device or both so that the video includes images of various facets of the artifact. The video includes a series of image frames. The video is processed by a processing device to produce the electronic file. The processor may be part of an electronic device that is integral with the image capture device, or it may be a separate structure. When the processing device receives the video, it selects a set of some or all of the video's image frames, determines a frame quality for each frame in the set, and identifies a subset of the frames such that the frame quality of each frame in the subset satisfies one or more image quality criteria. The subset will include at least one frame for each facet of the multi-faceted printed artifact, such as a page of the document. The processor then automatically combines the subset of frames into a single electronic file. For example, in the case of a multi-page document, each frame of the file may correspond to a page of the document.

In some embodiments, determining the frame quality of each frame and identifying the subset may include at least one of the following actions: (1) determining whether the frame includes a presence of a user's hand on the artifact, and if so determining that the frame does not satisfy the one or more image quality criteria; (2) determining whether the frame exhibits movement of a user's hand over the artifact, and if so determining that the frame does not satisfy the one or more image quality criteria; (3) determining whether the frame includes each border of the artifact, and determining that the frame satisfies the one or more criteria only if the frame includes each border of the artifact; (4) determining an image quality score for the frame, and determining that the frame satisfies the one or more criteria only if the image quality score satisfies a numeric threshold; or (5) analyzing motion detector device data and time-correlating the motion detector device data to the frame, and determining that frame satisfies the one or more criteria only if the frame does not correspond to a threshold level of motion of the image capture device.

In embodiments where determining the frame quality of each frame includes determining whether the frame includes a presence of a user's hand on the artifact, the process of determining whether the frame includes the presence of the user's hand on the artifact may include: (1) dividing the frame into a set of N×N sub-blocks of pixels, where N equals an integer N>1; (2) for each sub-block, determining a standard deviation of luminance values of the pixels within each sub-block; (3) for each sub-block, comparing the standard deviation with a standard deviation of a corresponding sub-block in a reference frame for which there is known to be no hand presence to yield a difference; and (4) if the difference is larger than a threshold then determining whether the frame includes the presence of the user's hand on the artifact.

In embodiments where determining the frame quality of each frame includes determining whether the frame includes each border of the artifact, the system may do so by using one or more techniques such as a template matching technique and a constant color border identification technique.

In embodiments where determining the frame quality of each frame includes determining an image quality score for the frame, the process of determining the image quality score may include extracting a set of patches from the frame, determining a feature vector for each of the patches from the frame, pooling the determined feature vectors, and classifying an image quality of the frame based on the feature vectors.

In some embodiments, when selecting the set of image frames, the system may subsample the series of image frames of the video to identify a representative set of image frames that will comprise the video to be processed. In some embodiments, after identifying the subset of frames and before automatically combining the subset of frames into a single electronic file, the system may perform one or more of the following image processing operations on at least one of the frames in the subset: de-skew, de-rotation, perspective correction, automatic cropping, image enhancement, or image binarization.

In some embodiments, determining the frame quality and identifying the subset of frames may occur in real time while the receiving occurs. If so, then before combining the subset of frames the system may determining that a first cluster of the received frames corresponds to a first one of the facets, output a notification that one of the frames in the first cluster exhibits acceptable frame quality, determine that a second cluster of the received frames corresponds to a second one of the facets, and output a notification that one of the frames in the second cluster exhibits acceptable frame quality.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, a "printed artifact" or "artifact" refers to a substrate on which alphanumeric characters, images and/or other content items have been printed. Reference to an artifact as "multifaceted" means that the artifact includes multiple substrates on which content has been printed. Examples of such artifacts include a multi-page document, a book, a brochure, a two-sided check or a driver's license. The term "multifaceted" also may refer to an artifact that is physically large in size such that a camera would require multiple still photographs to be taken in order capture the entire document with sufficient resolution to read the alphanumeric content. Examples of the second type of multifaceted document include a poster, engineering drawing (e.g., a blueprint), billboard or other large printed surface.

A "mobile electronic device" refers to a portable computing device that includes an image capturing device, a processor and tangible, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

A "video capture module" refers to a software application and/or the image sensing hardware of an electronic device that is capable of optically viewing a scene and converting an interpretation of that scene into electronic signals so that the interpretation is saved to a digital video file comprising a series of images.

The embodiments described in this document relate to the capture and processing of a video of a multi-faceted printed artifact, such as a multi-page or two-sided document. A mobile electronic device containing a video capture module, such as a smart phone, handheld video camera, media player having image capture capabilities, or other device may used to capture the video. The device, or a processing system that receives video captured by such a device, automatically extracts from the video a collection of still images representing logical facets of the printed artifact. The automatic extraction process may include any of the following steps: (i) temporal and spatial subsampling to reduce computation; (ii) video analysis to remove frames exhibiting significant motion arising from the user interacting with the artifact; (iii) use of accelerometer and gyroscope data to eliminate frames involving significant camera shake; (iv) use of an image quality metric to select the best of the remaining frames; and (v) combining of said frames to produce a digital output file representing all facets of the original printed artifact.

The use of mobile devices for scanning hardcopy content comes with unique opportunities as well as unique challenges. Advantages may include low cost, portability, ubiquity, increasing computational power, and/or the presence of multiple sensors on a single device. One of the challenges with existing systems is that it is cumbersome to capture a multi-faceted printed artifact such as a multi-page document. In prior systems, a user may us an imaging application to take multiple still photos, one for each page of the document. The photos may then be bundled into a single collection or file. The multiple captures are cumbersome and time consuming.

This document describes the use of video to capture multi-faceted artifacts. If the system were to merely capture a video of the document, the raw video file could prohibitively large for storage or transmission. The method and system described below address that problem by automatically identifying and removing frames that are not necessary, leaving only a set of image frames that is optimally suited to capture the document in a smaller image files.

Figure 1:
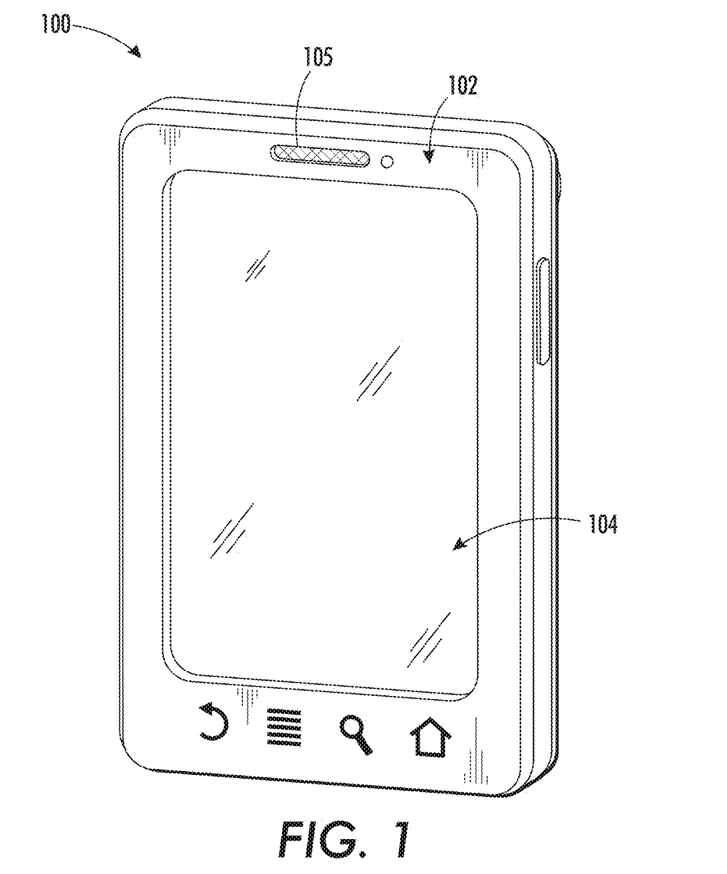
FIG. 1 depicts a first or front face of a mobile device that includes a video camera configured to capture a series of images according to an embodiment.

FIG. 1 shows one example of a mobile electronic device, generally designated 100. The mobile electronic device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, including, but not limited to, resistive touchscreens, capacitive touchscreens, and infrared touchscreens.

Figure 2:
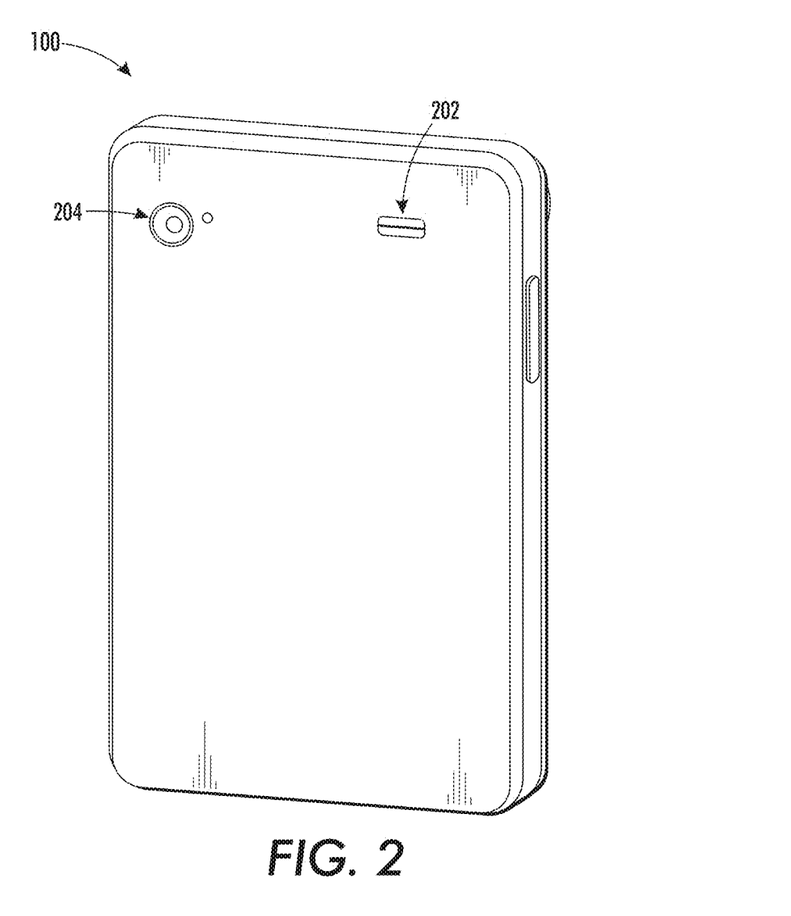
FIG. 2 depicts a second or rear face of a mobile device that includes a video camera configured to capture a series of images according to an embodiment.

FIG. 2 shows a rear face 202 of the mobile electronic device 100. The rear face 202 may include an image capture device 204. The image capture device 204 may be any suitable component capable of receiving an optical image and transmitting the information to other components for processing.

While the image capture device 204 is depicted on the rear face of the present example, persons skilled in the art will appreciate that the imaging device 204 may be positioned at any location upon any face of the mobile device 100, or it may even be external to the mobile device 100 and connected by any means of electronic communication, including, but not limited to, physical cable communication such as universal serial bus (USB), wireless radio communication, wireless light communication, or near field communication technology.

In some embodiments, the display 104 may be positioned within the mobile device 100, and may be configured in such a way so as to display the output of the imaging device 204 in real time so that the user may view the display 104 and see the output of the imaging device 204 on the display. The display 104 is one type of user interface that the device may include. The device may include other types of user interfaces such as an audio output 105. such as a speaker or audio port.

Accordingly, the configuration of the mobile device 100 as shown in FIGS. 1 and 2 is only an example, and persons skilled in the art will appreciate other configurations that are able to achieve a similar overall result.

Figure 3:
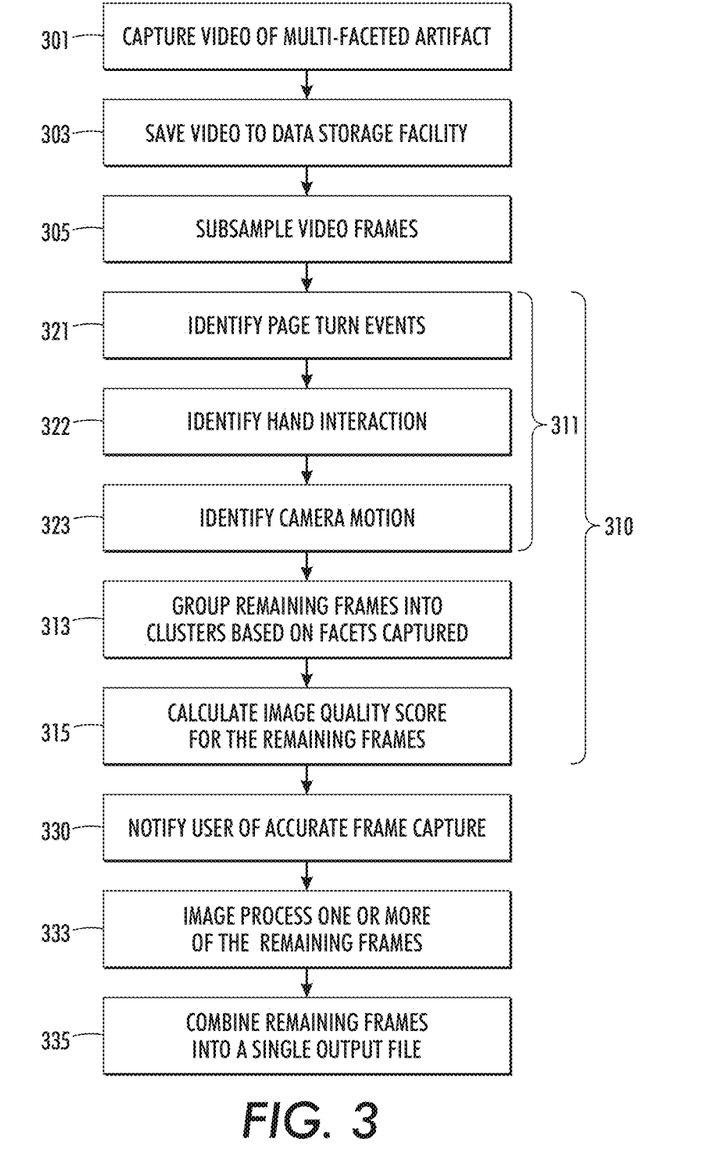
FIG. 3 is a flowchart that illustrates a method of processing a video to create a digital output file representing a document.

FIG. 3 is a flowchart illustrating several steps that a system may follow to capture video of a multi-faceted printed artifact and extract a collection of images for each facet of the artifact. In one embodiment, the artifact is a document such as a physically large document or multi-page document. Referring to FIG. 3, a user may use a video capture module of a mobile electronic device to capture a video 301 of the artifact. The video capture may occur while the user moves the artifact, the image capture device, or both so that the video includes images of a multiple facets of the artifact. For example, the user may operate the video capture module to receive an image sequence of (i) a multi-page document while the user turns the pages; (ii) a multi-sided document while the user flips the document over; or (iii) a large document while the user moves the camera around to multiple facets (i.e., smaller areas) of the large document.

The video may be saved to a data storage facility 303, such as a memory of the mobile electronic device. Optionally, the video capture module, data storage facility, and processor that performs the remaining steps may be part of the same mobile electronic device. In such an option, the processing may be performed as the video is captured into a data storage facility such as random access memory. Alternatively, the video capture module and/or data storage facility may be separate from the processor that performs the remaining steps, and the processor may perform its operations on a video file that is retrieved from the data storage facility.

The system will automatically process the video to remove a subset of the frames to yield a set of remaining frames, so that the remaining frames include at least one frame for each facet of the multi-faceted printed artifact 310. This may include any of several sub-processes, which will be described below. As used in this document, the term "removing" may or may not refer to removing a frame from an original video file. In some embodiments, it may leave the original, full video file intact and this by "removing" frames the system may exclude the "removed" frames in a newly-created digital output file. In other embodiments, the system may remove frames from an original file, such as a video stream as it is received or the full file as retrieved from memory.

The sub-processes involved in the process of removing frames from a video 310 may include steps such as: (i) analyzing the video to identify and remove frames that have captured significant motion 311; (ii) grouping the remaining image frames into clusters 313, wherein each image frame in any single cluster corresponds to a common facet; and (iii) for each cluster, determining an image quality score for each of the cluster's image frames 315. Optionally, if only one frame remains for a particular facet, the frame need not be considered part of a cluster, and no score may be required for the frame. For each cluster, the process may then include removing, from each cluster, each image frame that does not exhibit an acceptable image quality score 317 so that a smaller group of frames, and optionally a single frame, remains for each facet of the artifact. Example embodiments of each of these sub-processes will be described in more detail.

Optionally, the system may notify the user of successful capture of a quality frame of a facet 330. After the frames are removed, the system may automatically combine the remaining frames into a single electronic document file 335 that includes multiple images, saved as multiple pages, frames or other units in a document.

Optionally, before combining the frames into the electronic document file, the system may perform image processing 333 on any or all of the frames so that the frames provide a substantially uniform orientation, size, perspective, border, and/or clarity for each unit of the document. For example, the system may analyze each frame and perform a de-skew or de-rotation process on any or all frames so that the pages in each of the frames exhibit a substantially uniform skew and/or orientation. The system also may perform perspective correction, automatic cropping, image enhancement, image binarization or other processing techniques to improve the resolution or clarity of any frame, or to yield substantial consistency across frames. Any now or hereafter known image processing technique for the processes listed above may be used in this image processing step.

Optionally, before performing any of the steps listed above, such as before saving the video to a memory and/or before removing frames from the video, the system may subsample 305 the video to reduce the size and/or number of frames of the video that will be processed in or more of the processing steps. In one example, the system may perform spatial subsampling of each frame by a factor of 4 in x-and y-directions, which means only every $4^{th}$ pixel in the x and y directions are retained for analysis. The system may additionally or instead temporally subsample the video by a factor in order to reduce computational cost. In the practiced embodiment the temporal subsampling factor is 15, which means every $15^{th}$ frame is considered for analysis. Optionally, different subsamples may be used for different processing steps, and some steps may use the full video rather than a subsample. In general, the subsampling rate may depend on any of several factors such as spatial and temporal resolution of the video, the nature of the content being captured, and/or the storage and processing capability of the mobile device.

In some embodiments, the step of identifying and removing frames in the series that exhibit significant motion 311 may include detecting images that correspond to (i) a page turn 321, (ii) a hand interaction 322; and (iii) camera motion (such as jitter) 323. The system may then remove each of the frames that exhibits at least a threshold level of motion.

As noted above, one method of identifying frames exhibiting significant motion may include identifying page turn events 321. A page turn event may be considered to be an event that causes a frame to exhibit a significant level of motion because a user's hand is moving over the page. An example of a method of determining page turn events 321 may be a method that determines whether the frame exhibits movement of a user's hand over the artifact. In one embodiment, the absolute differences in pixel intensity values between adjacent frames in the selected set are determined to yield an absolute difference image. If the pixels are stored as red, green, and blue values, then the system may determine a grayscale or luminance value as a weighted combination of pixel red, green, and blue values. The system also may determine an absolute difference in luminance values between adjacent frames. The system may apply a lowpass 2D filter on the absolute difference image. The system may apply a morphological erosion operator to remove small differences that may arise from effects such as shake and/or jitter. The resulting image may be binarized to produce binary blobs using a known binarization technique. The blobs may be stacked spatially over a number of successive frames, and the system may measure the size of the stacked blob. If the stacked blob size is greater than a threshold, then that frame may be deemed to exhibit movement of the user's hand over the artifact.

Figure 4:
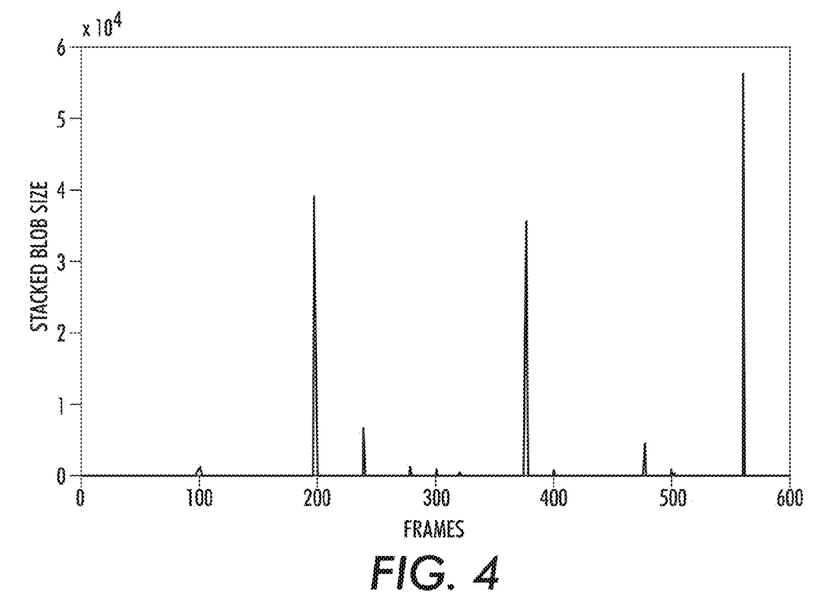
FIG. 4 illustrates data that a process may analyze when detecting page-turn events.

As an example, assuming a sampling rate of 30 frames/second and 1 to 2 seconds for a page-turn event, the system may detect 30-60 blobs during the whole event. The system may measure the size of blob stacked over, for example, 6 frames. An example of this is shown in FIG. 4, where the x-axis corresponds to a sequence of frames (or sub-sampled frames) in a video, and the y-axis shows stacked blob size. Peaks correspond to page turn events. Thus, because there are three peaks, the document analyzed is a three-page document, and frames corresponding to any portion of the peaks will be removed from the video As noted above, returning to FIG. 3, another method of identifying frames exhibiting significant motion may include identifying hand interaction events 322. Hand-interaction events may include the presence of a user's hand on the artifact. One may assume that a user's hand is likely to interact with the printed artifact before and during page-turn. Thus, the system may analyze frames occurring just prior to the page-turn event and remove those frames that exhibit significant luminance change with respect to a reference frame for each page. A "significant" luminance change may be one that is than a fixed or adaptive threshold. The threshold may be assessed dynamically, or it may be predetermined. For example, the threshold may be a luminance level that has been measured from a reference frame that is known to not include the presence of a user's hand.

Figure 5:
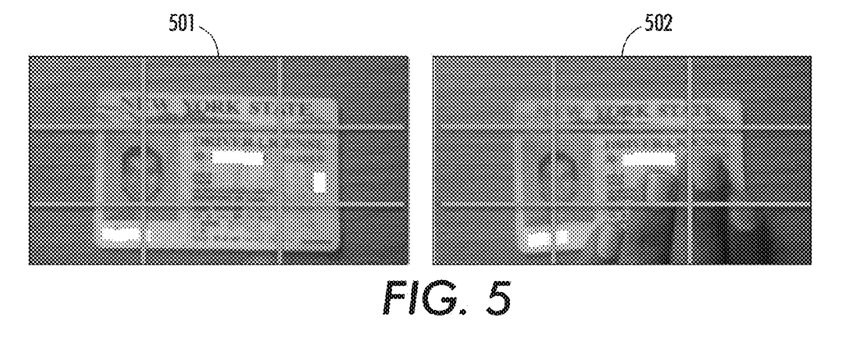
FIG. 5 depicts an example of the use of luminance detection to detect a hand interaction.

As an example, referring to FIG. 5, to determine whether a frame exhibits the presence of a user's hand on the artifact, the system may identify multiple frames 501, 502 prior to a page turn event and divide each frame into a matrix of any number of N×N sub-blocks of pixels, wherein N>1, and it may measure the standard deviation a of luminance values of the pixels within each sub-block. This is performed for both the reference frame 501, which is known to not include the presence of the user's hand, and a frame that is being analyzed prior to the page turn event 502. If the difference in a between the reference frame and the analyzed frame is larger than a predefined or dynamically determined threshold, then the frame is identified as containing a hand-interaction and eliminated.

This approach may be used even for non-paper artifacts like a driver's license, identification card, or credit card. The reference frame may be randomly sampled from a set of frames belonging to initial capture of page when it is unoccluded. For the first page, the set of frames belonging to first 1-2 seconds may be used, while for subsequent pages, frames occurring immediately after a page-turn event can be used to pick a reference frame.

As noted above, returning to FIG. 3 another method of identifying frames exhibiting significant motion may include identifying camera motion events 323. A page turn event may be considered an event that causes a frame to exhibit a significant level of motion. The system may use data from the mobile electronic device's accelerometer for detecting frames with significant motion-blur due to hand movement. The accelerometer may record the acceleration of the device in three orthogonal directions (x, y and z) in space. The system also may include a clock or timer that outputs a time, and when recording the acceleration of the device, the system may use the time output (saved as a timestamp) to correlate accelerometer data with frames.

The raw accelerometer data obtained may include an amount of noise, so the system may apply a smoothing filter:

$$acc^s_x(t) = \alpha * acc^s_x(t-1) + (1-\alpha) * acc_x(t)$$

where $acc^s x(t)$ represents the filtered value at timestamp t in the x direction, $acc_x(t)$ is the original acceleration value in the x direction, and $\alpha$ is a constant.

The system may subtract the effect of gravity from the three accelerometer readings. If we assume that the electronic device is stationary at time t=0, then the recorded values may be assumed to arise primarily due to gravity. The system can then subtract this initial effect from subsequent recordings to estimate the acceleration arising from hand motion. Alternatively, the system may can use output data from the device's gyroscope to provide readings of angular speeds, derive orientation of the device accordingly, compute the effect of gravity in three directions over time, and subtract this from the accelerometer reading. Using the timestamp of accelerometer data and the sampling rate of video, the frames with significant acceleration in any of the three directions may be marked for removal. The system also may determine the velocity for each video frame based on acceleration, time and previous velocity, and frames with significant velocity are marked for motion-blur. Computation of velocity may be done to detect motion when the device has zero or low acceleration. Frames with significant (i.e., more than a threshold level of) acceleration and/or velocity may be marked for removal.

As noted above, the system also may group frames into clusters for each facet 313, and score the frames within each cluster for image quality 315. It may then select a frame to keep for each facet based on the score, so that one of the best quality images is retained for each facet.

Figure 6:
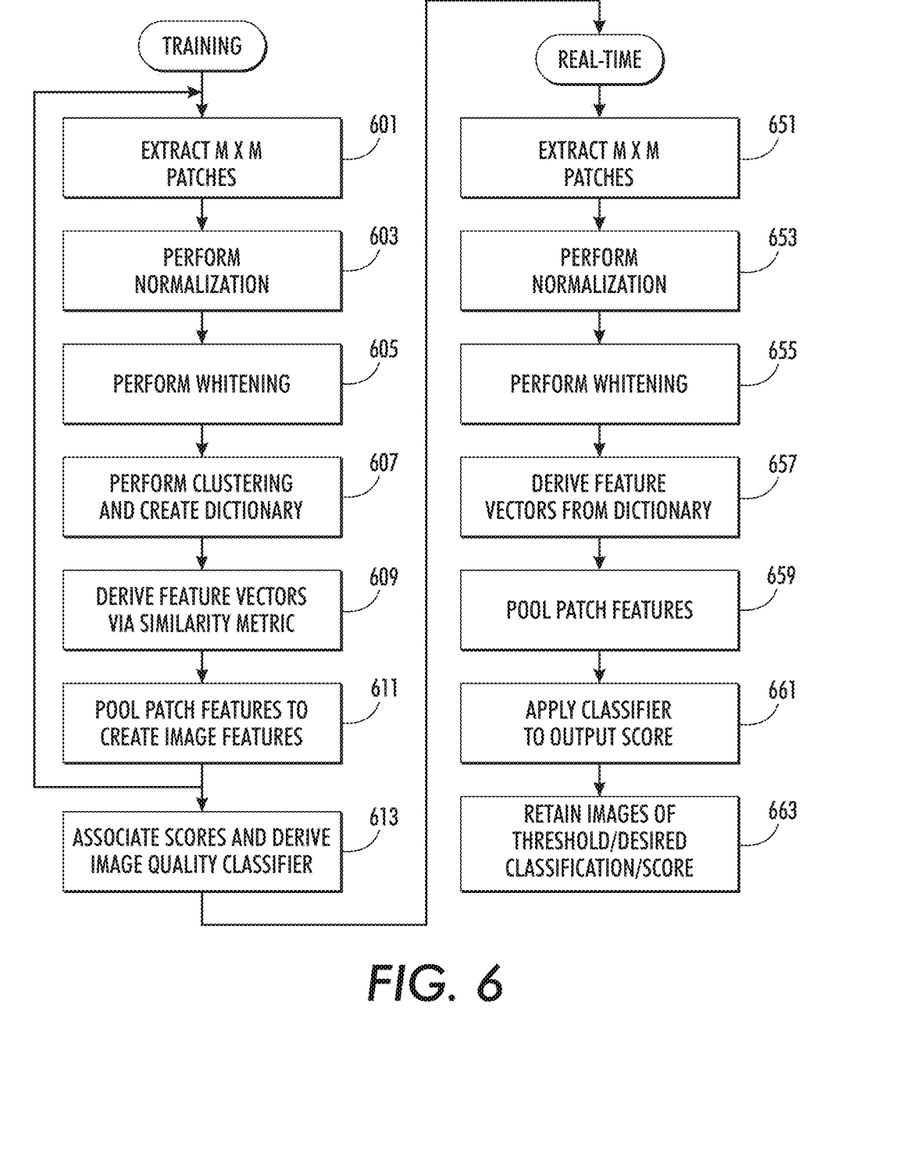
FIG. 6 is a process flow diagram describing a method of training a system to determine image quality, and using the trained system in real time.
Figure 7:
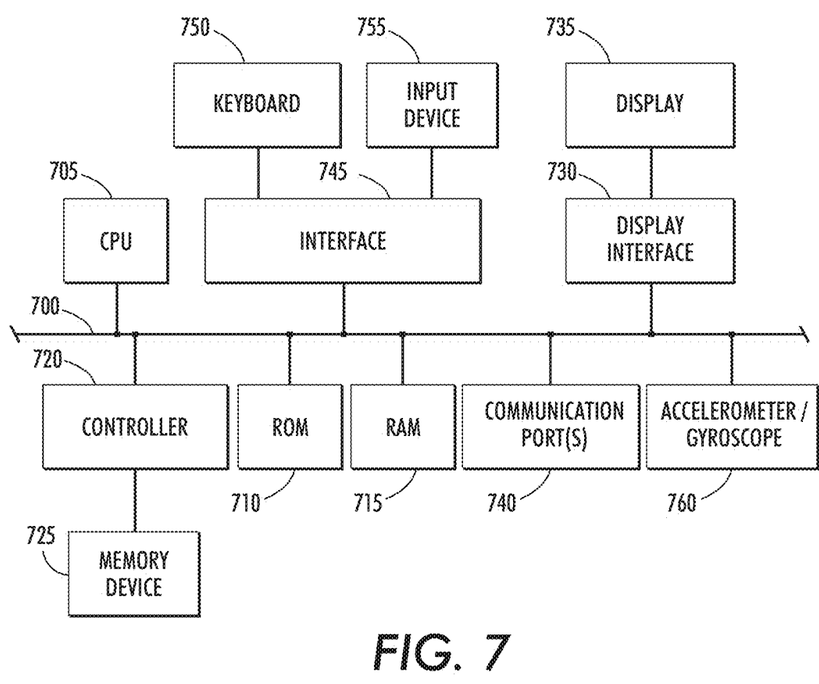
FIG. 7 depicts various embodiments of a computing device for implementing the various methods and processes described herein

In one embodiment, referring to FIG. 6, the system uses a learning based approach for predicting the optical character recognition (OCR) quality of a video frame. In an offline training phase, the system may access a training video, convert the RGB frames of the view to grayscale images, and randomly extract a set of M×M patches from the training images 601. The patches are converted to 1-D vectors of length $M^2$ and grouped into K clusters using a technique such as K-means clustering. The K cluster centroids are collected into a dictionary. In this example, M represents the patch size, and K represents the number of clusters. Choices of M and K may be determined heuristically.

As an example, the system may use values of M=11 and K=50. Before clustering, for the purpose of this example each patch must be normalized 603 by subtracting the mean and dividing by standard deviation of its elements. The system then performs Zero Component Analysis (ZCA) based whitening 605 to the normalized patches. The system clusters the patches to create a dictionary 607, that is, a data structure that captures representative structures (edges, corners etc.) in high quality images as well as images with distortions (e.g. blurry, low-contrast) resulting in poor OCR accuracy.

Next, each M×M image patch may be transformed into a feature vector as follows: The i-th patch is reformatted into a vector $x_i$ of length $M^2$, and normalized and/or whitened. Next, a dot product is computed between $x_i$ and each of the dictionary cluster centroids $D_1, \ldots, D_K$. This derives patch features via a similarity metric, which results in a feature vector $c_i$ 609 given by:

$$c_i = [\max(x_i . D_1, 0) \ldots \max(x_i . D_K, 0), \max(-x_i . D_1, 0) \ldots \max(-x_i . D_K, 0)]$$

Note that $c_i$ provides a measure of similarity between patch $x_i$ and the elements of dictionary D. Next, the $c_i$ for all patches in a single frame are pooled into a single feature vector $\beta$ representing the entire video frame 611. There are several possible pooling techniques, of which one is element-wise "max-pooling" given by:

$$\beta_i = \max(c_{1i}, c_{2i}, \ldots, c_{Ni})$$

As shown in FIG. 6, this process may be repeated for any number of frames. At this stage, each frame or image from the training set is represented by feature vector $\beta$.

Next, the system associates with each training image an image quality score, optionally via an offline process. For example, in the case where the printed artifact is a text document, Optical Character Recognition (OCR) accuracy can be used as an image quality score. Specifically, the training image may be processed through an OCR module, and the percentage of correctly recognized characters may be the score for that image. In an embodiment, the score may be categorized into one of two categories, "bad" or "good," by comparing OCR accuracy against a threshold. Finally, the system may derive an image quality classifier 613 that classifies each input feature β into one of these two class labels, or other class labels. Many classifiers exist in the literature or may be developed for the purpose of this application. For example, one that may be used is the linear Support Vector Machine (SVM) classifier. Note that the classifier can readily be extended to handle more than two class labels.

As shown in the left side of FIG. 6, any or all of the aforementioned steps may be performed offline to train the dictionary and SVM classifier. Then, in a real time application as shown on the right side of FIG. 6, the system may perform some or all of the following steps on a given video frame that is received to determine an image quality score for the frame. Random M×M patches $x_i$ may be extracted from the frame 651 and optionally normalized 653 and/or whitened 655. The patches may be transformed into feature vectors $c_i$ 657 by, for example, determining a dot product against the dictionary elements that comprise the codebook that was formed during the training process. Features $c_i$ are pooled into a single feature β 659 representing the entire video frame, and this feature is then mapped through the derived SVM classifier to generate a score 661, such as a numeric score or other classification such as a "good" versus a "bad" classifier. The classifications may correspond to image quality criteria such that only frames with a desired classification (e.g., "good") may be retained 663.

The number of patches (N) extracted from a frame to predict the quality affects both the quality of score predicted and the computational time. The optimal value may be determined empirically in order to reduce the computation time.

Another indicator of capture quality is whether a complete view of the page or artifact is captured in at least one of the frames. To this end, the system may apply any now or hereafter known border detection algorithm to the frame to determine whether a full border (i.e., all edges of the facet) is present in the image frame. Two example approaches for this process include a template matching technique and a constant color border identification technique In a template matching technique. a template may be obtained (such as in the form of a binary image file), and the system may assess data for each frame to find data matching that of the template. The system may calculate a score representing how closely the frame matches the template. If the frame has a score that equals or exceeds a certain threshold, then it may be accepted otherwise. Otherwise, it may be removed. A fast directional Chamfer-matching method is one example of a template matching process. In a constant color border identification technique, the system may separate the edge of the artifact with its content. For example, in technical articles and forms, there is a border of white space. The system may apply a distance-transform based border detection method to evaluate the quality of frame. It may find the distance of each background pixel (white) to nearest foreground pixel (black). If the value is low, the system may presume that the area is a content region. If the value is high, the system may presume that the area represents a border. The system may then threshold the distance transform values to obtain the borders and determine whether all four borders are present in the frame.

Returning to FIG. 3, as noted above, while processing frames the system may notify the user when it has received an acceptable image of a facet of the artifact 330. Real time notification and feedback may be very helpful to the user during the capture. Such feedback can serve as a signal to the user to proceed to the next page. This may be done while the video is continuously captured. Or, the system may use a simplified procedure for real time notification, in which it operates only on low-resolution viewfinder video frames, bypasses certain processing steps (e.g., the frame selection and hand detection step), and executes only certain steps such as accelerometer/gyroscope data processing and step quality scoring. Notification can be given in a variety of ways, including visual (e.g. a red/green flag on the display) or an audio prompt (e.g. a beep).

As additional options, after processing the images and developing a video containing an image frame for each facet of the artifact, the system may subject the resulting image frames to additional post-processing operations such as de-skew, de-rotation, automatic cropping, and image cleanup and/or enhancement. The output file may be stored in any suitable image format, such a sequence of individual images in PDF, PowerPoint, JPEG, TIFF, or other formats.

The video capture method and process as described above may be performed and implemented by an operator of a portable electronic device having a video camera. FIG. 6 depicts an example of internal hardware that may be used to contain or implement the various computer processes and systems as discussed above. For example, mobile device 100 as discussed above may include a similar internal hardware architecture to that as illustrated in FIG. 6. An electrical bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 6, is a processing device, computing device or processor as such terms are used within this disclosure. Read only memory (ROM) 710 and random access memory (RAM) 715 constitute examples of memory devices.

A controller 720 interfaces with one or more optional memory devices 725 that service as date storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network, or a cellular telephone data network.

The hardware may also include an interface 745 which allows for receipt of data from input devices such as a keyboard 750 or other input device 755 such as a remote control, a pointing device, a video input device and/or an audio input device. The hardware also may include one or more motion detection devices 760, such as an accelerometer and/or gyroscope.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating an electronic file corresponding to a multi-faceted printed artifact, the method comprising:
   by a processing device, receiving a video of a multi-faceted printed artifact, wherein the video comprises a series of image frames;
   by the processing device, selecting a set of the image frames so that the set does not include image frames that exhibit a significant level of motion;
   by the processing device, determining a frame quality for each frame in the set;
   by the processing device, identifying a subset of the frames so that the frame quality of each frame in the subset satisfies one or more image quality criteria, and the subset comprises at least one frame for each facet of the multi-faceted printed artifact; and
   by the processing device, automatically combining the subset of frames into a single electronic file.

2. The method of claim 1, wherein receiving the video comprises:
   by a video capture module of an image capture device, capturing the video while a user moves the artifact, the image capture device, or both so that the video includes images of a plurality of facets of the multi-faceted printed artifact; and
   wherein the processing device and the video capture module comprise elements of a mobile electronic device.

3. The method of claim 2, wherein selecting the set of image frames so that the set does not include image frames that exhibit a significant level of motion comprises performing, for each frame, at least one of the following:
   determining whether the frame includes a presence of a user's hand on the artifact, and if so determining that the frame exhibits a significant level of motion because it includes a page turn event;
   determining whether the frame exhibits movement of a user's hand over the artifact, and if so determining that the frame exhibits a significant level of motion because it includes a hand interaction; and
   analyzing motion detector device data and time-correlating the motion detector device data to the frame, and determining that the frame exhibits a significant level of motion only if it corresponds to a threshold level of motion of the image capture device.

4. The method of claim 3, wherein
   selecting the set of image frames so that the set does not include image frames that exhibit a threshold level of motion comprises determining whether the frame includes a presence of a user's hand on the artifact; and
   determining whether the frame includes the presence of the user's hand on the artifact comprises, by the processor:
   dividing the frame into a set of N ×N sub-blocks of pixels, where N equals an integer N>1,
   for each sub-block, determining a standard deviation of luminance values of the pixels within each sub-block,
   for each sub-block, comparing the standard deviation with a standard deviation of a corresponding sub-block in a reference frame for which there is known to be no hand presence to yield a difference, and
   if the difference is larger than a threshold then determining that the frame includes the presence of the user's hand on the artifact.

5. The method of claim 1, wherein determining the frame quality of each frame and identifying the subset comprises determining an image quality score for the frame, and determining that the frame satisfies the one or more criteria only if the image quality score satisfies a numeric threshold.

6. The method of claim 1, wherein determining the frame quality of each frame and identifying the subset comprises determining whether the frame includes each border of the artifact by using a template matching technique and a constant color border identification technique.

7. The method of claim 5, wherein determining the image quality score comprises, by the processor:
   extracting a set of patches from the frame;
   determining a feature vector for each of the patches from the frame;
   pooling the determined feature vectors; and
   classifying an image quality of the frame based on the feature vectors.

8. The method of claim 1, wherein selecting the set of image frames further comprises subsampling the series of image frames to identify a representative set of image frames that will comprise the video to be processed.

9. The method of claim 1 wherein the determining and identifying occur in real time while the receiving occurs, and the method further comprises, before the combining:
   determining that a first cluster of the received frames corresponds to a first one of the facets;
   outputting a notification that one of the frames in the first cluster exhibits acceptable frame quality;
   determining that a second cluster of the received frames corresponds to a second one of the facets; and
   outputting a notification that one of the frames in the second cluster exhibits acceptable frame quality.

10. The method of claim 1, further comprising, after identifying the subset of frames and before automatically combining the subset of frames into a single electronic file, performing one or more of the following image processing operations on at least one of the frames in the subset: de-skew, de-rotation, perspective correction, automatic cropping, image enhancement, or image binarization.

11. A system, comprising:
   a processor; and
   a computer-readable memory containing programming instructions that, when executed, are operable to instruct the processor to:
   receive a video of a multi-faceted printed artifact, wherein the video comprises a series of image frames;
   select a set of the image frames so that the set does not include image frames that exhibit a significant level of motion;
   determine a frame quality for each frame in the set;
   identify a subset of the frames so that the frame quality of each frame in the subset satisfies one or more image quality criteria, and the subset comprises at least one frame for each facet of the multi-faceted printed artifact; and
   automatically combine the subset of frames into a single electronic file.

12. The system of claim 11, further comprising:
a video capture module, wherein the processing device, the video capture module, and the computer-readable memory comprise elements of a mobile electronic device; and
additional programming instructions that, when executed, are operable to cause the video capture module to capture the video while a user moves the artifact, the image capture device, or both so that the video includes images of a plurality of facets of the multi-faceted artifact.

13. The system of claim 11, wherein the instructions that, when executed, are operable to instruct the processor to select the set of image frames so that the set does not include image frames that exhibit a significant level of motion comprise instructions to:
determine whether the frame includes a presence of a user's hand on the artifact, and if so determining that the frame exhibits a significant level of motion because it includes a page turn event;
determine whether the frame exhibits movement of a user's hand over the artifact, and if so determine that the frame exhibits a significant level of motion because it includes a hand interaction; and
analyze motion detector device data and time-correlate the motion detector device data to the frame, and determine that the frame exhibits a significant level of motion only if it corresponds to a threshold level of motion of the image capture device.

14. The system of claim 13, wherein:
the instructions to select the set of image frames so that the set does not include image frames that exhibit a significant level of motion comprise instructions to determine whether the frame includes a presence of a user's hand on the artifact; and
the instructions to determine whether the frame includes the presence of the user's hand on the artifact comprise instructions to:
divide the frame into a set of N xN sub-blocks of pixels, where N equals an integer N>1,
for each sub-block, determine a standard deviation of luminance values of the pixels within each sub-block,
for each sub-block, compare the standard deviation with a standard deviation of a corresponding sub-block in a reference frame for which there is known to be no hand presence to yield a difference, and
if the difference is larger than a threshold then determine that the frame includes the presence of the user's hand on the artifact.

15. The system of claim 11, wherein the instructions to determine the frame quality of each frame and identifying the subset comprise instructions to determine an image quality score for the frame, and determining that the frame satisfies the one or more criteria only if the image quality score satisfies a numeric threshold.

16. The system of claim 11, wherein the instructions to determine the frame quality of each frame and identifying the subset comprise instructions to determine whether the frame includes each border of the artifact by using a template matching technique and a constant color border identification technique.

17. The system of claim 15, wherein the instructions to determine an image quality score for the frame comprise instructions to:
extract a set of patches from the frame;
determine a feature vector for each of the patches from the frame;
pool the determined feature vectors; and
classify an image quality of the frame based on the feature vectors.

18. The system of claim 11, wherein the instructions to select the set of image frames further comprise instructions to subsample the series of image frames to identify a representative set of image frames that will comprise the video to be processed.

19. The system of claim 11 wherein the instructions, when executed, are also operable to instruct the processor to perform the following before automatically combining the subset of frames into a single electronic file:
determining that a first cluster of the received frames corresponds to a first one of the facets;
outputting a notification that one of the frames in the first cluster exhibits acceptable frame quality;
determining that a second cluster of the received frames corresponds to a second one of the facets; and
outputting a notification that one of the frames in the second cluster exhibits acceptable frame quality.

20. A method of creating an electronic document file for a multi-page printed document, the method comprising:
by a processing device, receiving a video of a multi-page printed document, wherein the video comprises a series of image frames;
by the processing device, selecting a set of the image frames so that the set does not include image frames that exhibit a significant level of motion;
by the processing device, determining a frame quality for each frame in the set;
by the processing device, identifying a subset of the frames so that the frame quality of each frame in the subset satisfies one or more image quality criteria, and the subset comprises at least one frame for each page of the multi-page printed document; and
by the processing device, automatically combining the subset of frames into a single electronic file so that each frame of the electronic file represents a single page of the multi-page printed document.

21. The method of claim 20, wherein receiving the video comprises:
by a video capture module of an image capture device, capturing the video while a user moves the document, the image capture device, or both so that the video includes images of a plurality of pages of the multi-page printed document; and
wherein the processing device and the video capture module comprise elements of a mobile electronic device.

22. The method of claim 21, wherein selecting the set of image frames further comprises subsampling the video to reduce the number of image frames and yield of a representative image frame set.

23. The method of claim 22, wherein selecting the set of image frames so that the set does not include image frames that exhibit a significant level of motion comprises performing, for each frame, at least one of the following:
determining whether the frame includes a presence of a user's hand on the document, and if so determining that the frame exhibits a significant level of motion because it includes a page turn event;
determining whether the frame exhibits movement of a user's hand over the document, and if so determining that the frame exhibits a significant level of motion because it includes a hand interaction; and
analyzing motion detector device data and time-correlating the motion detector device data to the frame, and determining that the frame exhibits a significant level of motion only if it corresponds to a threshold level of motion of the image capture device.

24. A method of creating an electronic file corresponding to a multi-faceted printed artifact, the method comprising:
- by a processing device, receiving a video of a multi-faceted printed artifact, wherein the video comprises a series of image frames;
- by the processing device, selecting a set of the image frames so that the set does not include image frames that exhibit a significant level of motion;
- by the processing device, determining a frame quality for each frame in the set;
- by the processing device, identifying a subset of the frames so that the frame quality of each frame in the subset satisfies one or more image quality criteria, and the subset comprises at least one frame for each facet of the multi-faceted printed artifact; and
- by the processing device, automatically combining the subset of frames into a single electronic file,
- wherein, determining the frame quality of each frame comprises:
  - determining an image quality score for the frame by:
    - extracting a set of patches from the frame,
    - determining a feature vector for each of the patches from the frame,
    - pooling the determined feature vectors, and
    - classifying an image quality of the frame based on the feature vectors; and
  - wherein, identifying the subset of the frames comprises determining that the frame satisfies the one or more criteria only if the image quality score satisfies a numeric threshold.

25. A system, comprising:
- a processor; and
- a computer-readable memory containing programming instructions that, when executed, are operable to instruct the processor to:
  - receive a video of a multi-faceted printed artifact, wherein the video comprises a series of image frames;
  - select a set of the image frames so that the set does not include image frames that exhibit a significant level of motion;
  - determine a frame quality for each frame in the set;
  - identify a subset of the frames so that the frame quality of each frame in the subset satisfies one or more image quality criteria, and the subset comprises at least one frame for each facet of the multi-faceted printed artifact; and
  - automatically combine the subset of frames into a single electronic file,
  - wherein, the instructions to determine the frame quality of each frame comprise instructions to:
    - determine an image quality score for the frame by:
      - extracting a set of patches from the frame,
      - determining a feature vector for each of the patches from the frame, pooling the determined feature vectors, and
      - classifying an image quality of the frame based on the feature vectors; and
  - wherein the instructions to identify the subset of the frames comprise instructions to determine that the frame satisfies the one or more criteria only if the image quality score satisfies a numeric threshold.

* * * * *